United States Patent [19]

Snow

[11] 4,019,885

[45] Apr. 26, 1977

[54] REMOVING METAL DEPOSITS FROM THE SUPERSTRUCTURE OF A FLOAT GLASS CHAMBER

[75] Inventor: Richard R. Snow, Perrysburg, Ohio

[73] Assignee: Libbey-Owens-Ford Company, Toledo, Ohio

[22] Filed: Feb. 13, 1976

[21] Appl. No.: 657,928

[52] U.S. Cl. .................................. 65/32; 65/65 A; 65/99 A

[51] Int. Cl.² ........................................ C03B 18/02

[58] Field of Search ............ 65/27, 82, 65 A, 99 A

[56] References Cited

UNITED STATES PATENTS 3,494,755  2/1970  Montgomery ..................... 65/27

FOREIGN PATENTS OR APPLICATIONS 1,282,866  7/1972  United Kingdom ............... 65/99 A Primary Examiner—Arthur D. Kellogg
Attorney, Agent, or Firm—Collins, Oberlin & Darr

[57] ABSTRACT

The superstructure of a float chamber containing a bath of molten metal and having a confined atmosphere is purged of metal condensates adhering thereto on controlled occasions to produce a glass ribbon substantially free of "top speck" defects. Minute molten metal deposits condensing on the superstructure of the chamber are removed therefrom at brief and infrequent time intervals by introducing a fluxing agent such as a halogen or halide into the confined atmosphere causing the minute molten metal deposits to coalesce and drop from the superstructure onto the glass ribbon and/or the molten metal bath at the controlled occasions.

16 Claims, No Drawings

REMOVING METAL DEPOSITS FROM THE SUPERSTRUCTURE OF A FLOAT GLASS CHAMBER

BACKGROUND OF THE INVENTION

1. Field of the Invention

The present invention relates broadly to the manufacture of float glass and, more particularly, to a method for removing minute molten metal deposits from the superstructure of a float chamber.

DESCRIPTION OF THE PRIOR ART

A conventional form of a float glass forming chamber is illustrated and described in U.S. Pat. No. 3,743,495, issued on July 3, 1973. As there explained, the manufacture of flat glass by the float process involves delivering glass at a controlled rate onto a relatively wide bath of molten metal (usually tin) and advancing it along the surface of the bath under physical and thermal conditions which (1) assure that a layer of molten glass will be established on the bath, (2) that the glass in the layer can flow laterally to develop on the surface of the bath a buoyant body of molten glass of stable thickness, and (3) that the buoyant body in ribbon form will be continuously advanced along the bath and sufficiently cooled as it advances to permit it to be taken unharmed put of the bath by mechanical conveying means. Above the float bath of molten metal, a superstructure forming a tightly enclosed headspace or plenum chamber is provide to contain a so-called float atmosphere.

Since one of the advantages of float glass is that it is formed with the desired surface finish and so need not be ground and polished, successful commercial operation of the float process requires that no foreign matter of any kind be permitted to adhere to or accumulate on the upper or exposed surface of the float glass ribbon.

However, considerable difficulty has been experienced with a defect known as "tin drop" which results from droplets of molten tin falling or dripping from the superstructure forming the ceiling of the plenum chamber onto the surface of the newly formed hot glass ribbon. The float glass plenum chambers employed in manufacturing glass by this method have heretofore, after a period of operation, produced glass ribbons having droplets of metal on and/or embedded in their upper surfaces, creating defects that result in rejection of sizable areas of the ribbon for commercial use. Such defects, caused by evaporated and agglomerated metal dripping from the superstructure of the plenum chamber onto the glass ribbon result in seriously high, if not prohibitive, production losses.

It has been determined that such metal drop defects result from evaporation of molten metal from the areas of the float bath that are exposed to the float atmosphere at either side of the glass ribbon moving thereover and which condense or deposit in the open pores of the refractory surfaces inside the plenum chamber. Following penetration into and eventual closing of the open pores, a gradual build-up of the metal deposits continues at the refractory surfaces. However, instead of a uniform layer, the metal deposits primarily as individual globules varying considerably in size. Over a period of time under reducing conditions, the metal deposits on the ceiling of the chamber coalesce to a size large enough to cause them to fall or drip from the ceiling onto the glass ribbon. Thus, it is desirable to purge the metal deposits from the refractory surfaces when the glass is not usable.

SUMMARY OF THE INVENTION

According to the present invention, however, these metal drop defects can now be avoided during a production run of a glass ribbon by introducing a fluxing agent into the plenum chamber that will cause coalescence of the metal deposits adhering to the superstructure and subsequent dripping thereof on controlled occasions. It is, of course, desirable to use a fluxing agent which will not chemically react with the plenum atmosphere and the metal bath to produce contaminants of the glass.

Thus, the present invention contemplates a method of causing metal deposits adhering to the superstructure to fall or drip therefrom on controlled occasions, generally during periods of non-productive operation, such as when the thickness of the glass ribbon is being changed wherein the initial portion of the glass ribbon formed during the change is not saleable. The invention is directed to a method of removing metal deposits from the superstructure of a float chamber by introducing a fluxing agent into its confined atmosphere which causes minute molten metal deposits to coalesce and form large globular metal deposits which fall or drip onto the glass ribbon and/or molten bath only when the fluxing agent is being introduced into the float atmosphere. It has been found for this purpose that halogens in their gaseous state and halides that dissociate below 2000° F. (1093° C.) act as fluxing agents to cause the minute metal deposits such as tin to coalesce in their presence.

OBJECTS AND ADVANTAGES

Thus, an important object of this invention is to introduce a fluxing agent into a float atmosphere to cause minute molten metal deposits adhering to the float bath superstructure to coalesce and fall or drip therefrom.

Another object of this invention is to cause metal deposits to fall or drip from the superstructure of a float chamber only when the fluxing agent is being introduced into the confined atmosphere.

Still another object of this invention is to purge the plenum chamber during and as a part of conventional procedures for producing float glass.

Other objects and advantages will become apparent during the course of the following description.

DESCRIPTION OF THE PREFERRED EMBODIMENTS

The present invention has particular application in preventing defects in the top surface of the float glass during a production run which is manufactured in ribbon form on a bath comprising tin by the method described in the aforesaid mentioned U.S. Pat. No. 3,743,495.

As is known, the metal bath contained in a tank structure and the headspace over the bath are heated by radiant heat directed downwardly from heaters and this headspace, which contains the float atmosphere, is enclosed by a superstructure or plenum chamber which makes it possible to maintain a sufficient volume of protective gas over that part of the metal bath that is exposed at each side of the glass ribbon in the float chamber. The superstructure is provided at intervals with ducting connected by branches to headers through which the protecting gas is fed into the headspace at a rate to create a plenum therein. The protecting gas is one which will not chemically react with the bath metal to produce contaminants of the glass (for example, a mixture of nitrogen and hydrogen) and, by providing a plenum ingress to the headspace, entrance of atmospheric air is theoretically prevented.

Also as is known, the temperature of the glass in the buoyant layer or ribbon must be carefully controlled so as to progressively cool it from the entrance end to the discharge end of the chamber, by which time the ribbon surface should reach a temperature at which it is sufficiently stiffened to allow its transfer to a lehr on mechanical conveying means without damage to the surfaces.

As indicated above, a gradual build-up of metal and metal compounds (oxides and/or sulfides) on the interior surfaces of the superstructure of the bath occurs due to condensation of hot metal vapors in the cooler areas of the bath. The areas of the bath superstructure most susceptible to the build-up of metal deposits have been found to be near the exit end and the reheat sections of the bath. Thus, it may not be necessary to treat the whole bath, but only these localized areas.

It is believed that the metal deposits are present in the form of sub-microscopic particles up to globules approximately one-sixteenth inch in diameter. Following penetration into and eventually closing of the open pores of the refractory surfaces forming the superstructure, a gradual build-up of the metal deposits continues at the surfaces of the refractory. Due to some effect, possibly surface tension or absorption of the hydrogen in the protective gas at the surface of each discrete metal particle, the metal exhibits a tendency to resist coalescence. The metal exists primarily as individual globules varying considerably in size. However, it has been discovered that such metal deposits can be caused to coalesce at the elevated temperatures and in the reducing atmosphere of the plenum chamber by treatment with a fluxing agent.

It has been discovered that halogens in the gaseous state and halides that dissociate below about 2000° F. (1093° C.) will act as such a fluxing agent to cause coalescence of metal deposits such as tin in a reducing atmosphere, and that they will not chemically react therewith to produce contaminants of the glass. Laboratory work has shown that of the halogens, chlorine gas is the most effective and that of the halides, chloride compounds that dissociate below 2000° F. which is in the operating range of the float apparatus, are most effective. Chloride compounds such as ammonium chloride, stannous chloride and zinc chloride are effective as they dissociate below 2000° F. Also, it has been found that other halogens such as bromine and iodine and halides thereof are effective but not as suitable as chlorine. Because of its relatively low cost, availability and ease of handling, chlorine gas is ideally suited as the treating material of the invention.

EXAMPLE I

In view of the above-mentioned laboratory work, a production float glass facility experiencing a high incidence of tin drop was treated with chlorine gas. The molten metal rapidly coalesced and droped from the refractories as large globules, and it was found that after the treatment, the tin drop defects in the glass were markedly reduced. The treatment was applied at the end of a run of one particular thickness of glass and after two hours the treatment was discontinued and the ribbon thickness was changed. By the time the ribbon had stabilized at the new thickness, the tin deposits had stopped falling and normal operation could be resumed.

During the treatment, chlorine gas was introduced by a single probe through the roof in the forward end of the bath with a flow of 5 SCFH (standard cubic feed per hour) for a period of 2 hours. The chlorine gas, whose flow remained constant, traveled with the natural flow of the bath atmosphere toward the exit end of the bath. Tin deposits started falling immediately upon application of the chlorine gas and ended shortly after the gas was shut off. The heaviest fall of tin occurred during the first 20 to 30 minutes and it then dropped at a much lower rate. After the 2 hour treatment, the glass ribbon was substantially free of tin drop defects. It was observed that the number of tin drops on the ribbon was reduced by a factor of one-half to two-thirds following the treatment to produce flat glass of acceptable commercial quality.

EXAMPLE II

In another treatment, chlorine gas was introduced by a probe through the roof of the bath with a flow of 2.5 SCFH for a period of two hours. As in Example I, the chlorine gas flow also remained constant and traveled with the natural flow of the bath atmosphere toward the exit end of the bath. Also in this treatment, tin deposits started falling immediately upon application of the chlorine gas and ended shortly after the gas was shut off, with the heaviest fall occurring during the first 30 minutes of the traeatment.

From observations of the treatment, it appears that the effecfiveness of the chlorine gas treatment is dependent on the concentration and length of time of the treatment, and that gas flows of 2.5 to 5 SCFH are completely adequate to cause minute tin deposits to coalesce and fall from the superstructure when the gas contacts the deposits. Thus, it appears that the success of the treatment lies in exposure of the tin deposits on the superstructure to chlorine gas for only a brief period of time. It also appears that chlorine gas reduces the adhesion of rhe tin deposits to the refractory material forming the superstructure.

As indicated above, the quantity of chlorine gas supplied not only contacted the ceiling immediately adjacent the point of admission, but was also carried by the natural air currents within the float chamber throughout the superstructure and toward the cold end of the chamber.

It will be appreciated that although it appears particularly advantageous to apply the chlorine treatment in the areas of the chamber where the metal drop problems has existed or where it has been most severe, the treatment can also be carried out by introducing the chlorine gas as a constituent of the make-up gas forming the float atmosphere. While the particular concentration of chlorine gas and times given in the examples substantially purge the metal deposits from the bath superstructure, it is apparent that the effectiveness of the treatment is dependent on the concentration of the chlorine gas and the length of time of the treatment.

There are obvious practical and commercial advantages in carrying out the fluxing treatment of this invention in and as part of the procedures of operating a conventional float glass operation, and the procedures of the invention lend themselves particularly well to such an operation. That is, the times of the treatment may be determined by monitoring the tin deposit density on the glass ribbon and then conducting the treatment upon the next convenient occasion after the defect density has risen to a predetermined value. As previously indicated, particularly convenient occasions are during a change in thickness of the glass ribbon or during a change of composition of the glass, wherein the initial portion of the glass ribbon after the change is to be culleted or scrapped.

It is to be understood tht the forms of the invention herewith described are to be taken as illustrative embodiments only of the same and that various changes in steps of the method of the invention may be resorted to without departing from the spirit of the invention.

We claim:
1. A method of removing metal deposits from the superstructure of a float chamber having a non-oxidizing atmosphere over a bath of molten metal, wherein a portion of said molten metal has evaporated from said bath and condensed on said superstructure, comprising the steps of:
   a. introducing a fluxing agent selected from the group consisting of halogens, haldies and mixtures thereof, into said non-oxidizing atmosphere; and
   b. permitting said fluxing agent to travel along said superstructure with the natural flow of said non-oxidizing atmosphere so that said metal deposits condensed on said superstructure and contacted by said fluxing agent coalesce and drop from said superstructure.

2. A method of removing metal deposits from the superstructure of a float chamber as clamed in claim 1, wherein said fluxing agent is a halogen.

3. A method of removing metal deposits from the superstructure of a float chamber as claimed in claim 2, wherein said halogen is chlorine gas.

4. A method of removing metal deposits from the superstructure of a float chamber as claimed in claim 1, wherein said fluxing agent is a halide that dissociates below 2000° F. (1093° C.).

5. A method of removing metal deposits from the superstructure of a float chamber as claimed in claim 4, wherein said halide is ammonium chloride.

6. A method of removing metal deposits from the superstructure of a float as claimed in claim 4, wherein said halide is stannous chloride.

7. A method of removing metal deposits from the superstructure of a float chamber as claimed in claim 4, wherein said halide is zinc chloride.

8. A method of removing minute tin deposits from the superstructure of a float chamber having a reducing atmosphere over a bath of molten tin wherein a portion of said molten tin has evaporated in the hot regions of said float chamber and condensed on said superstructure in the cool regions of said float chamber comprising the steps of:
   a. introducing a halogen into said reducing atmosphere;
   b. permitting said halogen to pass along said superstructure in contact with said minute tin deposits on said superstructure;
   c. continuing introducing said halogen into said reducing atmosphere for a period of time until said minute tin deposits have coalesced into gobular tin deposits; and
   d. permitting said gobular tin deposits to drop from said superstructure onto said bath of molten tin.

9. A method of removing minute tin deposits from the superstructure of a float chamber as claimed in claim 8, wherein said halogen is chlorine gas.

10. A method of removing minute tin deposits from the superstructure of a float glass chamber as claimed in claim 9, wherein the chlorine gas is introduced into said reducing atmosphere for a period of at least 20 minutes at a rate of at least about 2.5 SCFH.

11. A method of removing minute tin deposits from the superstructure of a float glass chamber having a reducing atmosphere over a bath of molten tin wherein a portion of said tin has evaporated in the hot regions of said float chamber and condensed on said superstructure in the cool regions of said float chamber comprising the steps of:
   a. introducting a halide into said reducting atmosphere;
   b. permitting said halide to pass along said superstructure in contact with said minute tin deposits on said superstructure;
   c. continuin introducing said halide into said reducing atmosphere for a period of time until said minute tin deposits have coalesced into gobular tin deposits; and
   d. permitting said gobular tin deposits to drop from said superstructure onto said bath of molten tin.

12. A method of removing minute tin deposits from the superstructure of a float chamber as claimed in claim 11, wherein said halide is a chloride compound which dissociates below about 2000° F (1093° C.).

13. A method of removing minute tin deosits from the superstructure of a float chamber as claimed in claim 12, wherein said chloride compound is selected from a group comprising ammonium chloride, stannous chloride and zinc chloride.

14. A method of removing minute tin deposits from the superstructure of a float glass chamber as claimed in claim 8, wherein said halogen is introduced into said reducing atmosphere for a period of at least 20 minutes.

15. A method of producing float glass in which a ribbon of glass is formed on and advanced over a bath of molten metal contained in a float chamber having a superstructure defining a plenum containing a non-oxidizing atmosphere, including removing metal deposits formed on the superstructure by evaporation of the molten metal from the exposed surfaces of said bath and condensation of metal vapors on the superstructure by dropping said metal deposits from said superstructure on controlled occasions, comprising the steps of:
   a. introducing a fluxing agent selected from the group consisting of halogens, halides and mixtures thereof, into said non-oxidizing atmosphere on controlled occasions;
   b. permitting said fluxing agent to travel along said superstructure with a natural flow of said non-oxidizing atmosphere so that said metal deposits condensed on said superstructure and contacted by said fluxing agent coalesce on said superstructure;
   c. permitting said coalesced metal deposits to drop from said superstructure onto a portion of said glass ribbon; and
   d. separating said portion of said glass ribbon from the remainder of said ribbon.

16. A method of removing metal deposits from the superstructure of a float chamber having a non-oxidizing atmosphere over a bath of molten tin, wherein a portion of said molten tin has evaporated from said bath and condensed on said superstructure, comprising the steps of:

a. introducing a fluxing aent selected from the group consisting of halogens, halides and mixtures thereof, into said non-oxidizing atmosphere;

b. permitting said fluxing agent to travel along said superstructure with the natural flow of said non-oxidizing atmosphere so that said tin deposits on said superstructure contacted by said fluxing agent coalesce and drop onto said molten bath; and c. continuing the above steps of a length of time until said superstructure is substantially free of tin deposits.

* * * * *

UNITED STATES PATENT AND TRADEMARK OFFICE
CERTIFICATE OF CORRECTION

PATENT NO. : 4,019,885

DATED : April 26, 1977

INVENTOR(S) : Richard R. Snow

It is certified that error appears in the above–identified patent and that said Letters Patent are hereby corrected as shown below:

Col. 3, line 63, "droped" should be --dropped--
Col. 4, line 7, "feed" should be --feet--
Col. 4, line 43, "rhe" should be --the--
Col. 5, line 10, "tht" should be --that--
Col. 5, line 23, "haldies" should be --halides--
Col. 5, line 32, "clamed" should be --claimed--
Col. 6, cancel lines 9 through 40, inclusive.
Col. 6, line 41, cancel "15" and insert --11--
Col. 6, line 66, cancel "16" and insert --12--
Col. 7, line 4, "aent" should be --agent--
Col. 8, line 5, "of"/should be --for--
           (first occurrence)

On the Title Page, after the abstract, "16 Claims" should read -- 12 Claims --.

Signed and Sealed this ninth Day of August 1977

[SEAL]

Attest:

RUTH C. MASON
Attesting Officer

C. MARSHALL DANN
Commissioner of Patents and Trademarks